United States Patent
Takahashi et al.

(10) Patent No.: US 6,496,660 B2
(45) Date of Patent: Dec. 17, 2002

(54) IMAGE FORMATION APPARATUS WITH PRINTER ENGINE CONTROL WHICH JUDGES WHETHER RECORDING SHEETS CAN BE FED

(75) Inventors: Atsuya Takahashi, Shizuoka (JP); Kaoru Sato, Kanagawa (JP); Yoji Serizawa, Shizuoka (JP); Tatsuto Tachibana, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/860,462

(22) Filed: May 21, 2001

(65) Prior Publication Data

US 2002/0009301 A1 Jan. 24, 2002

(30) Foreign Application Priority Data

May 22, 2000 (JP) .......................... 2000-149982
Mar. 9, 2001 (JP) .......................... 2001-066807

(51) Int. Cl.[7] .......................... G03G 15/00; B65H 5/26
(52) U.S. Cl. .......................... 399/16; 271/9.13; 399/23; 399/388
(58) Field of Search .......................... 399/16, 23, 371, 399/381, 388, 391; 358/300; 271/9.01, 9.13

(56) References Cited

U.S. PATENT DOCUMENTS

| | | | |
|---|---|---|---|
| 4,992,882 A | * | 2/1991 | Ikenoue et al. ............. 358/300 |
| 5,294,966 A | * | 3/1994 | Shiokawa ................... 399/388 |
| 5,390,016 A | * | 2/1995 | Hoshi et al. ................ 399/371 |
| 5,408,304 A | | 4/1995 | Serizawa .................... 355/308 |
| 5,481,336 A | | 1/1996 | Tachibana et al. .......... 355/205 |
| 5,713,060 A | | 1/1998 | Sato et al. ..................... 399/20 |
| 5,875,373 A | | 2/1999 | Sato et al. ..................... 399/33 |
| 6,266,151 B1 | * | 7/2001 | Tachibana et al. ........... 358/1.4 |

* cited by examiner

Primary Examiner—Fred L Braun
(74) Attorney, Agent, or Firm—Fitzpatrick, Cella, Harper & Scinto

(57) ABSTRACT

An engine control unit and corresponding method of controlling the engine in which the engine control unit receives a print reservation command for plural pages prior to a print request command from a printer control unit. When the engine control unit received the print reservation command for the plural pages, it is judged whether or not a sheet feed operation of recording sheets can be performed. When it is judged that the recording sheets can be fed, the recording sheets are fed and transported to a predetermined position on a transportation path with a minimum constant interval corresponding to the sheet size by sheet feed rollers or transportation rollers, then printing operation is performed according to the print request command.

20 Claims, 7 Drawing Sheets

FIG. 8

PRINT RESERVATION COMMAND CODE SYSTEM

| BIT | CONTENTS |
|---|---|
| 1ST BIT | 0 |
| 2ND BIT | PRINT RESERVATION COMMAND CODE $2^9$ |
| 3RD BIT | PRINT RESERVATION COMMAND CODE $2^8$ |
| 4TH BIT | PRINT RESERVATION COMMAND CODE $2^7$ |
| 5TH BIT | PRINT RESERVATION COMMAND CODE $2^6$ |
| 6TH BIT | PRINT RESERVATION COMMAND CODE $2^5$ |
| 7TH BIT | PRINT RESERVATION COMMAND CODE $2^4$ |
| 8TH BIT | PRINT RESERVATION COMMAND CODE $2^3$ |
| 9TH BIT | PRINT RESERVATION COMMAND CODE $2^2$ |
| 10TH BIT | PRINT RESERVATION COMMAND CODE $2^1$ |
| 11TH BIT | PRINT RESERVATION COMMAND CODE $2^0$ |
| 12TH BIT | JOB ID NO. CODE $2^3$ |
| 13TH BIT | JOB ID NO. CODE $2^2$ |
| 14TH BIT | JOB ID NO. CODE $2^1$ |
| 15TH BIT | JOB ID NO. CODE $2^0$ |
| 16TH BIT | ODD PARITY BIT |

PRINT COMMAND CODE SYSTEM

| BIT | CONTENTS |
|---|---|
| 1ST BIT | 0 |
| 2ND BIT | PRINT COMMAND CODE $2^9$ |
| 3RD BIT | PRINT COMMAND CODE $2^8$ |
| 4TH BIT | PRINT COMMAND CODE $2^7$ |
| 5TH BIT | PRINT COMMAND CODE $2^6$ |
| 6TH BIT | PRINT COMMAND CODE $2^5$ |
| 7TH BIT | PRINT COMMAND CODE $2^4$ |
| 8TH BIT | PRINT COMMAND CODE $2^3$ |
| 9TH BIT | PRINT COMMAND CODE $2^2$ |
| 10TH BIT | PRINT COMMAND CODE $2^1$ |
| 11TH BIT | PRINT COMMAND CODE $2^0$ |
| 12TH BIT | JOB ID NO. CODE $2^3$ |
| 13TH BIT | JOB ID NO. CODE $2^2$ |
| 14TH BIT | JOB ID NO. CODE $2^1$ |
| 15TH BIT | JOB ID NO. CODE $2^0$ |
| 16TH BIT | ODD PARITY BIT |

IMAGE FORMATION APPARATUS WITH PRINTER ENGINE CONTROL WHICH JUDGES WHETHER RECORDING SHEETS CAN BE FED

BACKGROUND OF THE INVENTION

1. Field of the Invention

The present invention relates to an image formation apparatus of an electrophotographic system and a control method thereof.

2. Related Background Art

Conventionally, an image formation apparatus is composed of a printer controller which develops image code data transmitted from an external equipment such as a host computer or the like into bit data necessary for printing to be performed by a printer and reads internal information of the printer to display the information, and a printer engine control unit, of which an operation is controlled according to an instruction from the printer controller, notifies the internal information of the printer to the printer controller.

In case of performing printing on the basis of image data transmitted from the external equipment, the print controller which develops the image data executes a print instruction to the engine control unit, and the engine control unit which received the print instruction feeds sheets which are on a predetermined sheet feed cassette (a sheet feed tray) through a sheet feed port. When a printable state is prepared by performing initialization of an electrophotographic process, printing is executed on the basis of the image data transmitted from the external equipment while taking a synchronization in a vertical direction (synchronization between image writing to a photosensitive drum and paper feeding) with the printer controller.

In case of continuously printing plural pages, the print controller performs printing operation one page by one page in such order of a transmission of the print instruction, a vertical synchronization, a transmission of the print instruction of a second page and a vertical synchronization of the second page.

However, in the above conventional image formation apparatus, since it is structured that a sheet feed operation of a next page can be started after terminating vertical synchronization processing of the fed sheet, a page interval becomes longer in an image formation apparatus having a long sheet feed transportation path. Therefore, there occurred a problem that the capacity of a maximum throughput essentially possessed by an apparatus itself can not be efficiently exhibited.

SUMMARY OF THE INVENTION

The present invention has been made to solve the above problem, and an object is to provide an image formation apparatus which can maximumly exhibit the capacity of the maximum throughput essentially possessed by the apparatus itself without increasing the cost and a control method thereof.

A representative of the image formation apparatus and the control method thereof according to the present invention is an image formation apparatus of an electrophotographic system, comprising:

a sheet feed means for feeding recording sheets one by one;

a transportation means for transporting the recording sheets fed by the sheet feed means to a position where a visualized image formed on a photosensitive drum is transferred to the recording sheet, through a transportation path;

an engine control unit for controlling drives of the sheet feed means and the transportation means; and a printer control unit for developing image data and transmitting a print request command to the engine control unit, wherein the engine control unit has judgment means for judging whether or not the recording sheets can be fed when a print reservation command for plural pages of the sheets was received from the printer control unit prior to the print request command, and the drives of the sheet feed means and the transportation means are controlled to transport the recording sheets to a predetermined position on the transportation path when the judgment means judges that the recording sheets can be fed.

Preferably, a serial communication is performed between the engine control unit and the printer control unit.

Preferably, when it is designated that the sheets are fed from plural sheet feed ports according to the print reservation command for plural pages, the drives of the sheet feed means and the transportation means are controlled to transport the recording sheets from the plural paper feed ports to the lowest-stream position capable of performing printing in order of a print reservation for the plural pages prior to the print request command.

Preferably, when it is designated that the recording sheets are fed from the plural sheet feed ports according to the print reservation command for the plural pages, the drives of the sheet feed means and the transportation means are controlled to transport the recording sheets from the plural sheet feed ports to a stream position more upper than a junction of the most-upper-stream on the transportation path in case of feeding the sheets from the plural sheet feed ports prior to the print request command.

Preferably, when it is designated that the recording sheets are fed from the plural sheet feed ports according to the print reservation command for the plural pages, there equipped a mode for controlling the drives of the sheet feed means and the transportation means to transport the recording sheets from the plural sheet feed ports to the lowest-stream position capable of performing printing in order of the print reservation for the plural pages prior to the print request command, a mode for controlling the drives of the sheet feed means and the transportation means to transport the recording sheets from the plural sheet feed ports to a stream position more upper than the junction of the most-upper-stream on the transportation path in a case where the sheets were fed from the plural sheet feed ports prior to the print request command, and selection means for selecting one of the both modes.

An image formation apparatus of another aspect according to the present invention being the image formation apparatus of the electrophotographic system, comprises:

a sheet feed means for feeding recording sheets one by one;

a transportation means for transporting the recording sheet fed by the sheet feed means to a transference means for transferring a visualized image formed on a photosensitive drum to the recording sheet, through a transportation path;

an engine control unit for controlling drives of the sheet feed means and the transportation means; and a printer control unit for developing image data and transmitting a print command for issuing a print instruction and a print reservation command for previously instructing print information such as a sheet feed port, sheet size or the like prior to the print command, to the engine control unit through a serial communication line, wherein the engine control unit has judgment means for judging whether or not a sheet feed operation of the recording sheets can be performed when the print reservation command for plural pages was received from the printer control unit, and when the judgment means judged that the recording sheets can be fed, drives of the sheet feed means and the transportation means are controlled to transport the recording sheets to a predetermined position on the transportation path.

Preferably, plural sheet feed means are equipped, and the transportation means can be driven or stopped in driving of the transference means, the predetermined position on the transportation path is more upper than that of the transference means, and a leading edge of the recording sheet is on the lowest-stream position from where the sheet is not transported to the transference means when the transportation means is stopped, and the drives of the sheet feed means and the transportation means are controlled to feed and transport the recording sheets to the predetermined position on the transportation path in order of reception of the print reservation command, when the engine control unit receives the print reservation command for plural pages to be fed from the plural sheet feed means from the print control unit.

Preferably, plural sheet feed means are equipped, and each of the sheet feed means can be driven or stopped in driving of the transportation means, the predetermined position on the transportation path is more upper than that of a junction where a transportation path of another sheet feed means is interflowed, and a leading edge of the recording sheet is on the lowest-stream position from where the sheet is not transported to the junction when the sheet feed means is stopped, and the drives of the sheet feed means and the transportation means are controlled to feed and transport the recording sheets to the predetermined position on the transportation path from all of the sheet feed means reserved in the print reservation command, when the engine control unit receives the print reservation command for plural pages to be fed from the plural sheet feed means from the print control unit.

Preferably, when the engine control unit received the print reservation command for the plural pages to be fed from the plural sheet feed means from the print control unit, there equipped selection means which can select one of control means from first control means for controlling the drives of the sheet feed means and the transportation means to feed and transport the recording sheets to the predetermined position on the transportation path in order of reception of the print reservation command and second control means for controlling the drives of the sheet feed means and the transportation means to feed and transport the recording sheets to the predetermined position on the transportation path from all of the sheet feed means reserved in the print reservation command.

A control method of an image formation apparatus of an electrophotographic system according to the present invention, comprises:

a sheet feed step of feeding recording sheets one by one from sheet feed means;

a transportation step of transporting the recording sheets fed by the sheet feed means to a transference means for transferring a visualized image formed on a photosensitive drum to the recording sheet, through a transportation path;

an engine control step of controlling drives of the sheet feed step and the transportation step by an engine control unit; and a printer control step of developing image data and transmitting a print command for issuing a print instruction and a print reservation command for previously instructing print information such as a sheet feed port, sheet size or the like prior to the print command, to the engine control unit through a serial communication line by a printer control unit, wherein the engine control unit judges whether or not a sheet feed operation of the recording sheets can be performed when the print reservation command for plural pages is received from the printer control unit, and when it is judged that the recording sheets can be fed, drives of the sheet feed means and the transportation means are controlled to transport the recording sheets to a predetermined position on the transportation path.

Another image formation apparatus according to the present invention, comprises:

an image formation means for forming images on recording sheets;

a sheet feed means for feeding the recording sheets;

a transportation means for transporting the recording sheets fed by the sheet feed means to the image formation means through a transportation path;

an engine control unit for controlling drives of the sheet feed means and the transportation means; and a reception means for receiving a print request command transmitted from a printer control unit and a reservation command used in reserving printing prior to the print request command, wherein the engine control unit has judgment means for judging whether or not the recording sheets for pages corresponding to print reservation can be fed, and the plural recording sheets can be fed before receiving the print request command in accordance with a judgment of the judgment means in a case where the print reservation for plural pages is made by using the reservation command.

Preferably, plural sheet feed means are equipped, and at least one of the sheet feed means and sheet size can be instructed every the recording sheet of each page corresponding to the print reservation from the printer control unit.

Preferably, when the print reservation for plural pages to use the plural sheet feed means is made, printing is performed in order of the made print reservation, and the recording sheets are fed every page corresponding to the print reservation at timing of corresponding to information related to the recording sheets of pages previously print reserved.

Preferably, when the print reservation for the plural pages to use the plural sheet feed means is made, printing can be performed in an arbitrary order for the print reserved plural pages, and when the print reservation for the plural pages to use the plural sheet feed means is made, the engine control unit controls to feed and transport the recording sheets every the sheet feed means to be used to an upper-stream position of a junction, where a transportation path from the sheet feed means joins a transportation path from another sheet feed means.

Preferably, when the print reservation for the plural pages to use the plural sheet feed means is made, there equipped selection means which selects one of a first mode for performing printing in order of the made print reservation and a second mode for performing printing in an arbitrary order for the print reserved plural pages.

According to the present invention, a high speed image formation can be realized in the image formation apparatus of the electrophotographic system. Even if the transportation path of the recording sheets is designed to have a long path, an achievement of the maximum throughput can be easily realized without increasing the cost.

Other objects and features of the present invention will become apparent from the following detailed description and the attached drawings.

BRIEF DESCRIPTION OF THE DRAWINGS

FIG. 8 is a diagram showing the constitution of a print reservation command and a print command according to the second embodiment.

DETAILED DESCRIPTION OF THE PREFERRED EMBODIMENTS

Hereinafter, the embodiments of the present invention will be explained in detail with reference to the attached drawings. In the embodiment, an example of a printer will be explained among image formation apparatuses.

(First Embodiment)

Figure 1:
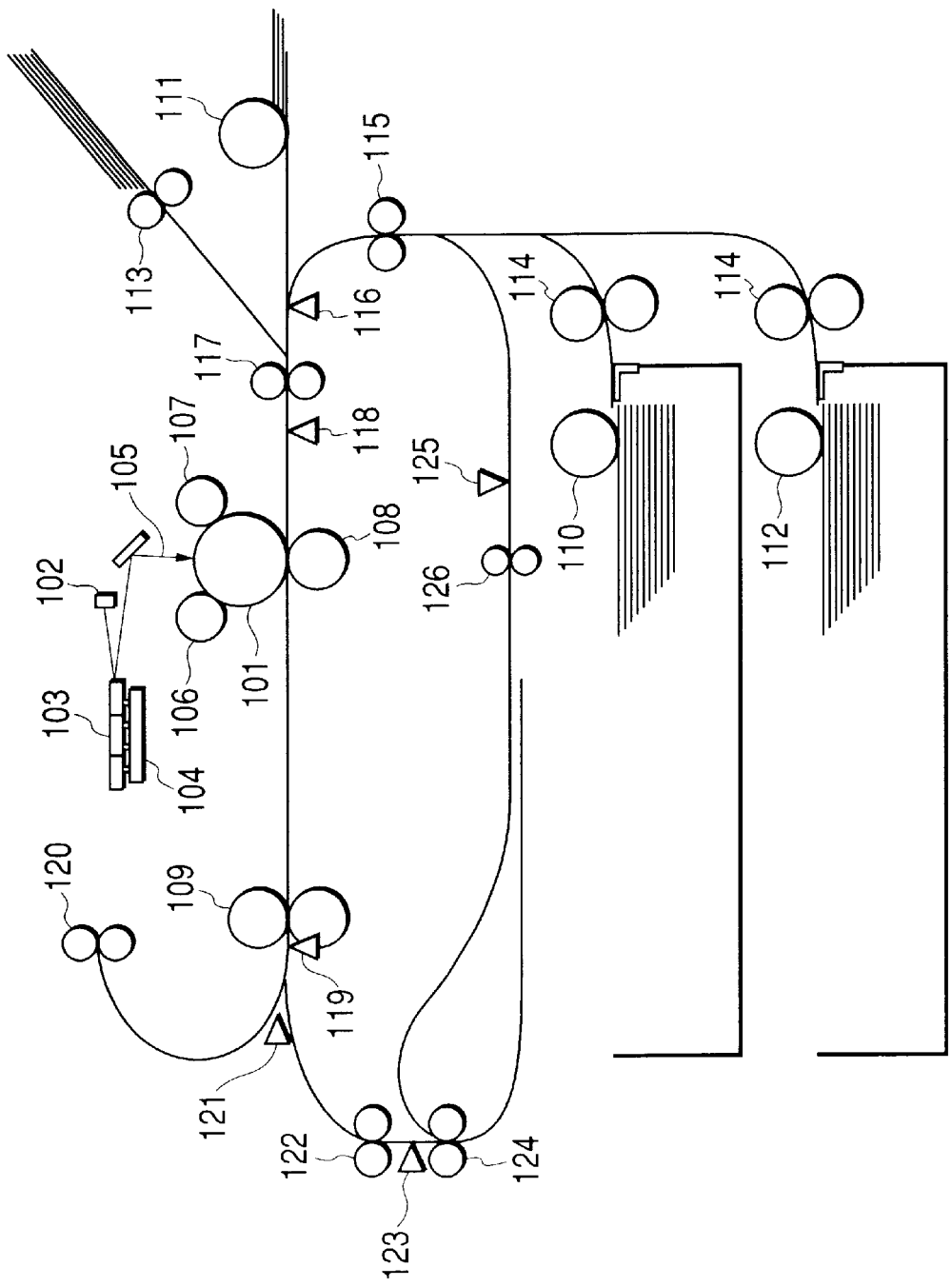
FIG. 1 is a longitudinal cross-sectional diagram showing the structure of a printer according to a first embodiment.

FIG. 1 is a longitudinal cross-sectional diagram showing the structure of a printer according to the first embodiment. In FIG. 1, numeral 101 denotes a photosensitive drum being an electrostatic latent image support body. Numeral 102 denotes a semiconductor laser unit serves as a light source. Numeral 103 denotes a rotative polygon mirror rotated by a scanner motor 104. Numeral 105 denotes a laser beam which is irradiated from the semiconductor laser unit 102 and scans a surface of the photosensitive drum 101.

Numeral 106 denotes a charge roller which uniformly charges the surface of the photosensitive drum 101. Numeral 107 denotes a developing unit which develops an electrostatic latent image formed on the photosensitive drum 101 using a toner. Numeral 108 denotes a transfer roller which transfers a toner image developed by the developing unit 107 to a predetermined recording sheet. Numeral 109 denotes a fixing unit which thermally fixes the toner transferred to the recording sheet.

A cassette sheet feed roller (sheet feed means) 110 feeds sheets from a cassette having a function of discriminating a size of the recording sheet and sends the recording sheet to a transportation path by one rotation. A manual sheet feed roller (sheet feed means) 111 sends the recording sheets from a manual tray not having the function of discriminating the size of the recording sheet to the transportation path through a sheet feed port. An option cassette sheet feed roller (sheet feed means) 112 sends the recording sheets from a detachable option cassette having the function of discriminating the size of the recording sheet to the transportation path. An envelope feeder sheet feed roller 113 (sheet feed means) sends the recording sheets one by one from a detachable envelope feeder capable of stacking only the envelopes to the transportation path. Transportation rollers 114 and 115 (transportation means) transport the recording sheets fed from the cassette or the option cassette.

A prefeed sensor 116 detects a leading edge and a trailing edge of the fed sheet. Pre-transfer rollers 117 (transportation means) send the transported sheet to the photosensitive drum 101. A top sensor 118 takes a synchronization (vertical sync) with image writing (recording/printing) to the photosensitive drum 101 and a sheet transportation for the transported sheet and measures length of the fed sheet in the transporting direction. A sheet discharge sensor 119 detects presence/absence of the sheet, to which fixing processing was executed. Sheet discharge rollers 120 discharge the sheet, to which the fixing processing was executed, to the outside of the apparatus.

A flapper 121 switches a transport destination (discharge to a tray, or a detachable two-faced processing unit) of the printed sheet. Transportation rollers 122 (transportation means) transport the sheet, which is transported to the detachable two-faced processing unit by switching the flapper, to a reverse unit. A reverse sensor 123 detects a leading edge and a trailing edge of the sheet transported to the reverse unit. A sheet refeed roller 124 (sheet feed means) reverses the sheet by sequentially performing a rotation/reverse rotation operation and sends the sheets to a sheet refeed unit.

Figure 2:
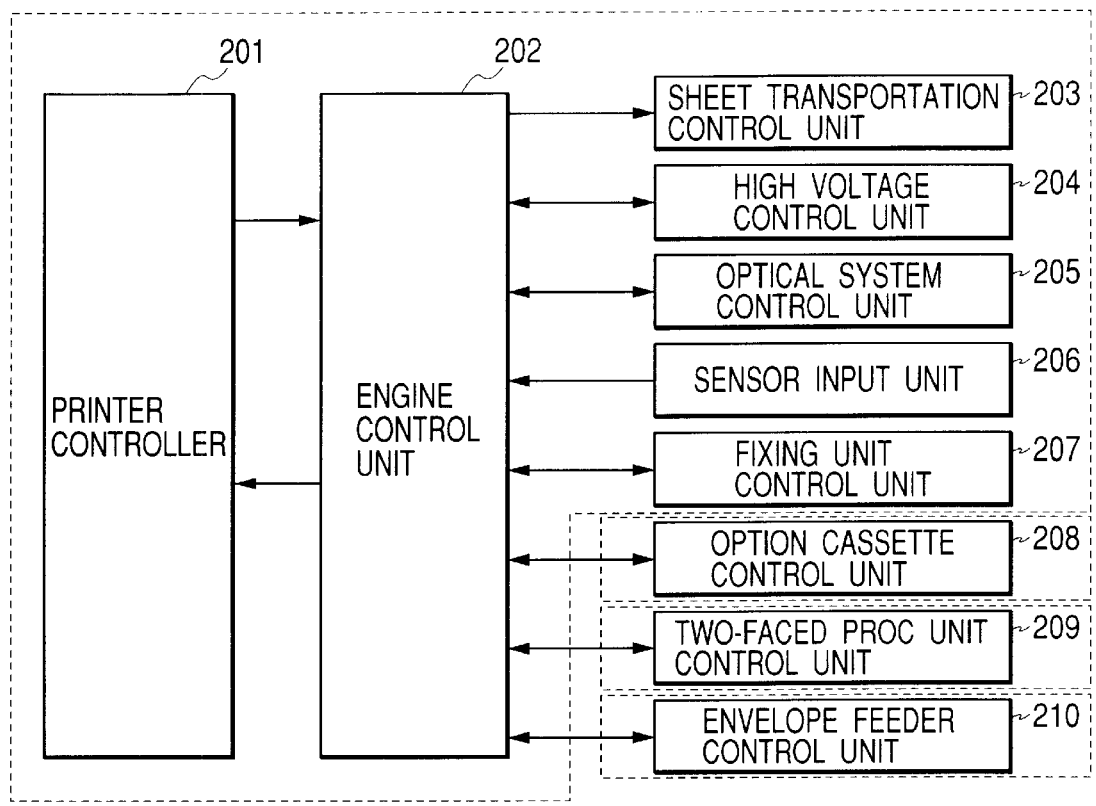
FIG. 2 is a block diagram showing the circuit structure of a control system of the printer according to the first embodiment.

FIG. 2 is a block diagram showing the circuit structure of a control system for controlling such a mechanism as described above. In FIG. 2, a printer controller 201 (a printer control unit) develops image code data transmitted from an external equipment such as a host computer (not shown) or the like into bit data required in printing and reads information in a printer to display it.

A printer engine control unit 202 controls an operation of each section of a printer engine according to an instruction from the printer controller 201 and notifies the information in the printer to the printer controller 201. A sheet transportation control unit 203 performs drive/stop operations of motors, rollers and the like used in feeding and transporting the recording sheets according to an instruction from the printer engine control unit 202. A high voltage control unit 204 performs a control of each high voltage output in each step of discharging, developing, transferring or the like according to the instruction from the printer engine control unit 202.

An optical system control unit 205 controls the drive/stop operations of the scanner motor 104 and the lighting of the laser beam according to the instruction from the printer engine control unit 202. A fixing unit control unit 207 performs the drive/stop operations of power conducting to a fixing heater according to the instruction from the printer engine control unit 202.

A sensor input unit 206 according to the prefeed sensor 116, the top sensor 118, the reverse sensor 123 or the like notifies the presence/absence of the sheets in the cassette and the presence/absence of the sheets in the transportation path to the printer engine control unit 202.

A detachable option cassette control unit 208 performs the drive/stop operations of a driving system according to the instruction from the printer engine control unit 202 and notifies the presence/absence of the sheets and sheet size information to the printer engine control unit 202.

A control unit 209 of the detachable two-faced processing unit reverses the sheet, performs a sheet refeed operation according to the instruction from the printer engine control unit 202 and simultaneously notifies the above state to the printer engine control unit 202.

A detachable envelope feeder control unit 210 performs the drive/stop operations of the driving system according to the instruction from the printer engine control unit 202 and notifies the presence/absence of the sheets to the printer engine control unit 202.

Between the printer controller 201 and the printer engine control unit, a 16-bit serial communication is performed. For 16-bit command data transmitted from the printer controller 201, the printer engine control unit 202 retransmits information in the engine as 16-bit status data in accordance with the command contents. Furthermore, processing of performing an operation according to the command contents is executed.

The printer controller 201 can transmits at least two kinds of 16-bit command data of a print reservation command and a print command to the printer engine control unit 202. The print reservation command is previously transmitted to the printer engine control unit 202 prior to the print command. For example, a command code system of the print reservation command may be same as that of the second embodiment (FIG. 8) described later or may be such a form which does not contain a job ID in each of 12th to 15th bit codes shown in FIG. 8. In case of containing the job ID, the printer controller 201 transmits the command data to the printer engine control unit 202 by adding an ID number in order of pages to be printed later according to the print reservation command. In this case, for example, such a constitution of performing a cancellation of the reservation by specifying the job ID is applicable. It should be noted that it may be constituted that a reservation regarding the recording sheets already fed is not to be canceled. The engine control unit 202 which received the command performs sheet feed and transportation operations in order of the reserved ID from a designated sheet feed port. For example, when the print reservation command is received in a state that the sheet feed port is designated for a cassette having a function of discriminating the size of the recording sheet, one of the sheets stacked on the cassette is picked up by rotating the sheet feed roller 110, and then the picked up sheet is transported by driving the transportation rollers 114 and 115. When the prefeed sensor 116 detects a leading edge of the transported sheet, drives of the transportation rollers 114 and 115 are stopped to stop the transportation of the sheets. Accordingly, the leading edge of the sheet fed and transported from the cassette is fed and transported to a predetermined position between the prefeed sensor 116 and the pre-transfer rollers 117.

The print command is transmitted to the printer engine control unit 202 from the printer controller 201 which terminates to develop printing data received from the external equipment such as the host computer (not shown) or the like into bit map data. The printer engine control unit 202 which received the print command starts the scanner motor and the fixing unit and initializes an electrophotographic process. When it is terminated to initialize the electrophotographic process, the drives of the transportation rollers 114 and 115 are restarted, and the transportation of the sheet, which was fed and transported to the predetermined position when the print reservation command was received, is restarted. Thereafter, at a time point when the top sensor 118 detected the leading edge of the sheet, printing operation is started while taking a vertical direction synchronization with the printer controller 201.

Figure 3:
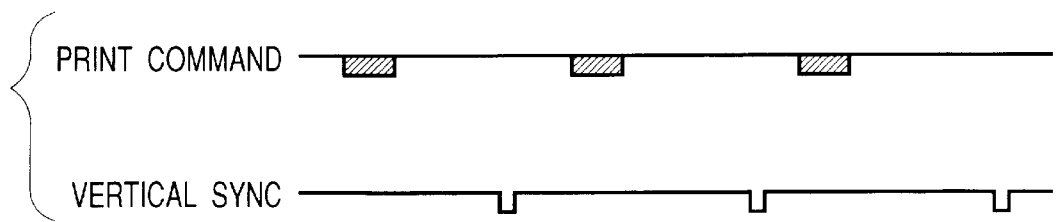
FIG. 3 is a diagram indicating timing between a print command and a vertical synchronization according to the first embodiment.

In case of continuously printing plural pages, the print controller 201 transmits the print command of a follower sheet to the printer engine control unit 202 after performing a vertical synchronization of a precedent sheet. The print command of the follower sheet can not be transmitted prior to a vertical synchronization signal. For example, as shown in FIG. 3, with respect to the print command and a vertical synchronization, the printer controller 201 transmits the print command of the follower sheet synchronizing with the vertical synchronization in order of the print command for a first sheet, the vertical synchronization for the first sheet, the print command for a second sheet and the vertical synchronization for the second sheet. On the contrary, the print reservation command for plural pages can be transmitted non-synchronized with the vertical synchronization. In the present embodiment, in a case where the print reservation for plural pages to use the plural sheet feed ports is made, printing is performed in order of the made print reservation.

Figure 4:
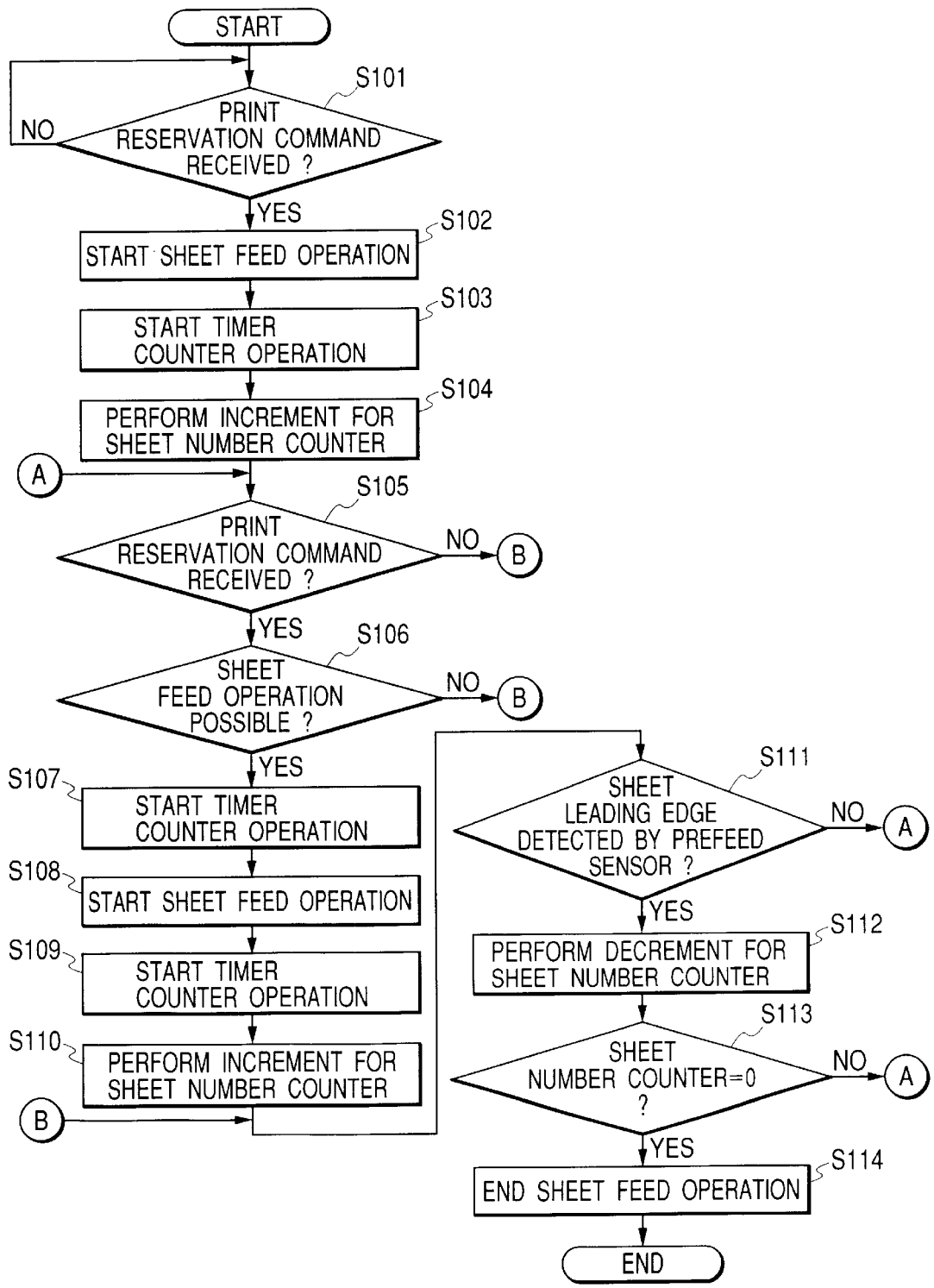
FIG. 4 is a flow chart showing a sheet feed control operation according to the first embodiment.

FIG. 4 is a flow chart showing a control sequence of a sheet feed operation of the printer engine control unit 202 which received the above plural print command. It should be noted that this operation is performed by an instruction from a CPU (not shown) on the basis of a program stored in a ROM (not shown).

First, in a step S101, it is confirmed whether or not the print reservation command is received from the printer controller 201. In case of not receiving the print reservation command, a reception of the print reservation command is always observed. The printer engine control unit 202 which received the print reservation command in the step S101 starts a sheet feed operation of feeding the sheets from the cassette, the manual tray and the envelope feeder which are designated from the printer controller 201 in the step S101, through each sheet feed port. In a case where the sheet feed port is not designated, a default sheet feed port held by the engine when the power is turned on or a sheet feed port designated by the just before reservation is set. Designation of the sheet feed port is performed by outputting a sheet feed port designation command or a recording sheet size designation command from the printer controller 201 prior to the print reservation command. In case of the latter command, a sheet feed port capable of feeding the recording sheet of designated size is set.

Then, in a step S103, an operation of a timer for measuring a sheet feed interval used in judging whether or not a sheet feed operation of the follower sheet can be performed, is started. When the precedent sheet is stopped to be fed, this timer stops the operation during the stopped period. In a step S104, an increment for a counter, which confirms the number of the sheets in feeding the sheets, is performed.

If printing operation is performed for one sheet, since the printer controller 201 transmits the print reservation command only one time, the printer engine control unit 202 does not identify the print reservation command for the follower sheet in a step S105, and the prefeed sensor 116 detects the leading edge of the sheet in a step S111, thereby performing a decrement for the counter which confirms the number of the sheets in feeding the sheets in a step S112 to confirm that the counter indicates "0" in a step S113, then the sheet feed operation is terminated.

In case of performing printing for plural pages, since the printer controller 201 transmits the print reservation command for these pages, a reception of the print reservation command for the follower sheets is confirmed in a step S105. In the step S106, the printer engine control unit (judgment means) 202 which received the print reservation command for the follower sheets confirms a timer value of the timer of which operation is started in the step S103, and it is confirmed whether or not the sheet feed operation of the follower sheets is in possible timing of performing that operation. The timer value for the start of the sheet feed operation differently varies according to the size of the precedent sheet and the sheet feed port of the precedent sheet or the follower sheet, and references the start of the sheet feed operation of the precedent sheet so as to achieve the maximum throughput by performing the sheet feed operation of realizing a minimum constant interval corresponding to the sheet size. When the precedent sheet is stopped, since the timer stops its operation during the stopped period, when reaching a timer value for the start of the sheet feed operation of the follower sheet before the precedent sheet reaches a predetermined position, the sheet feed operation of the follower sheet is also started, and the both recording sheets are transported. On the other hand, even if the precedent sheet reaches the predetermined position, when not reaching the time value for the start of the sheet feed operation of the follower sheet, the follower sheet is to be fed after the print command for the precedent sheet is received. Therefore, sheet feed timing of the follower sheet related to the reservation is such timing which corresponds to the presence/absence of the precedent sheet, the sheet feed port, transporting state and the sheet feed port of the follower sheet.

In the step S106, if the sheet feed operation of the follower sheet is in the possible timing of performing that operation, a timer operation for the precedent sheet is terminated in a step S107, and the sheet feed operation of the follower sheet is started in a step S108. Then, in a step S109, an initial value is set to the timer for measuring the sheet feed interval used in judging whether or not the sheet feed operation of a next follower sheet can be performed, then the operation of the timer is started, and perform the increment for the counter which confirms the number of the feed sheets in a step S110.

In case of printing plural pages, controls from the step S105 to the step S113 are repeated, and all the sheet feed operations are terminated in a step S114 by confirming that a counter for counting the number of the feed sheets indicates "0".

As described above, in the present embodiment, in case of printing the plural pages, if the sheet feed operation of the follower sheet is in the possible timing of performing that operation, the sheets are to be fed and transported to the predetermined position on the transportation path with the minimum constant interval corresponding to the sheet size without waiting for the termination of vertical synchronization processing of the fed sheets. Therefore, the image formation can be performed at a high speed, and an achievement of the maximum throughput can be easily realized without increasing the cost even if the transportation path is designed to have a long path.

(Second Embodiment)

Figure 5:
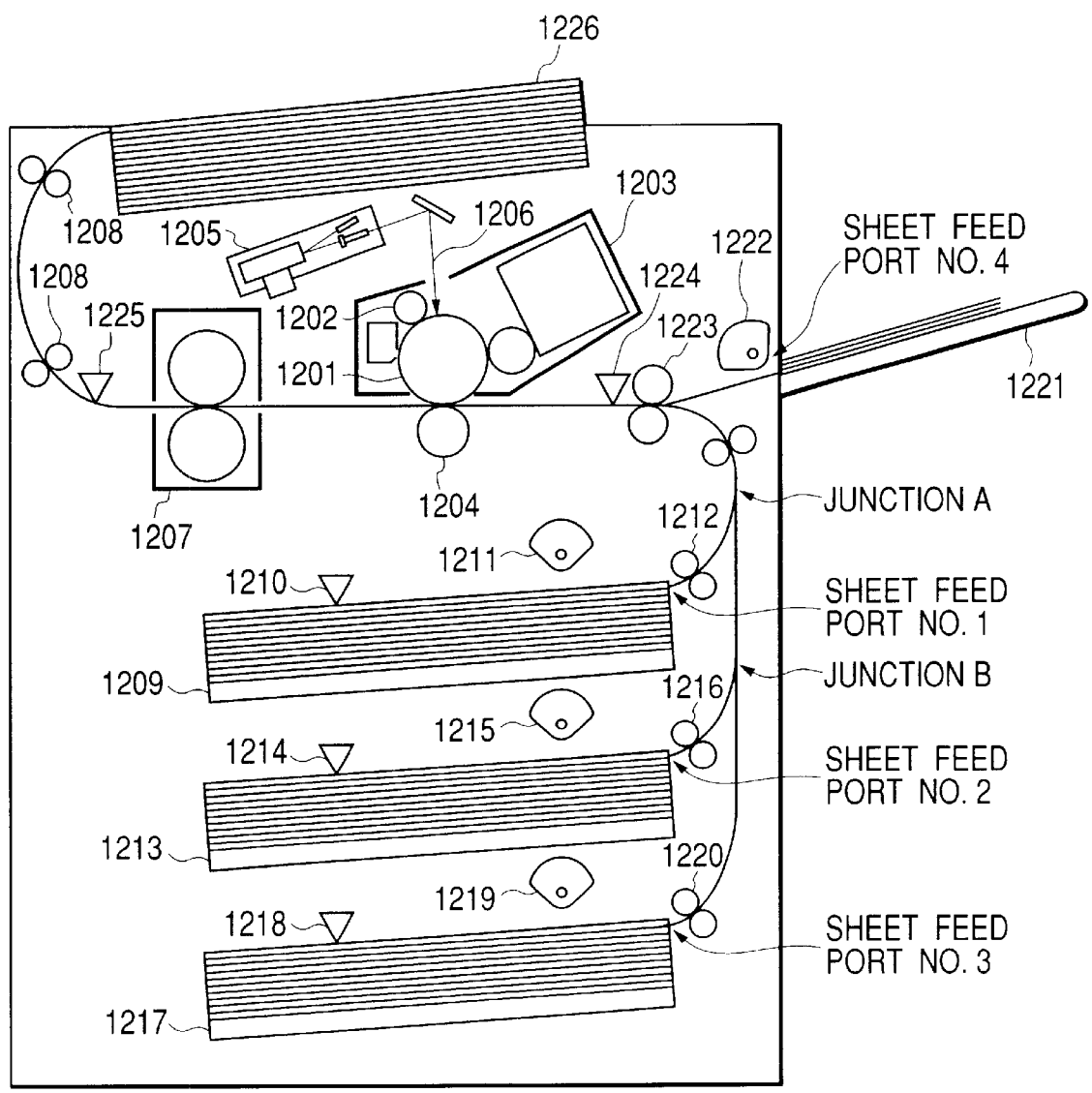
FIG. 5 is a longitudinal cross-sectional diagram showing the structure of a printer according to a second embodiment.

FIG. 5 is a longitudinal cross-sectional diagram showing the structure of a mechanism of a printer according to the second embodiment. In FIG. 5, numeral 1201 denotes a photosensitive drum on which an electrostatic latent image is formed. Numeral 1202 denotes a charge roller which uniformly charges a surface of the photosensitive drum 1201. Numeral 1205 denotes an optical unit which scans the surface of the photosensitive drum using a laser beam. Numeral 1206 denotes the laser beam which is irradiated from the optical unit 1205. Numeral 1203 denotes a developing unit which develops the electrostatic latent image formed on the photosensitive drum 1201 by the laser beam, using a toner.

Numeral 1204 denotes a transfer roller charge unit which transfers a toner image on the photosensitive drum 1201 to a predetermined sheet. Numeral 1207 denotes a fixing unit which melts the toner on the sheet to fix it to the sheet. Numeral 1208 denotes sheet discharge rollers which discharge the sheet, to which the fixing processing was executed, to the outside of an apparatus.

A cassette (No. 1) 1209 stacks the sheets to be moved to a sheet feed port No. 1. A cassette No. 1 sheet presence/absence sensor 1210 detects presence/absence of the sheets in the cassette (No. 1) 1209. A sheet feed roller (No. 1) 1211 feeds the sheets in the cassette (No. 1) 1209 on the basis of an instruction from an engine control unit. A transportation roller (No. 1) 1212 transports the sheets, which are started to be fed by the sheet feed roller (No. 1) 1211, to a transportation path.

A cassette (No. 2) 1213 stacks the sheets to be moved to a sheet feed port No. 2. A cassette No. 2 sheet presence/absence sensor 1214 detects presence/absence of the sheets in the cassette (No. 2) 1213. A sheet feed roller (No. 2) 1215 feeds the sheets in the cassette (No. 2) 1213 on the basis of an instruction from an engine control unit 302. A transportation roller (No. 2) 1216 transports the sheets, which are started to be fed by the sheet feed roller (No. 2) 1215, to a transportation path.

A cassette (No. 3) 1217 stacks the sheets to be moved to a sheet feed port No. 3. A cassette No. 3 sheet presence/absence sensor 1218 detects presence/absence of the sheets in the cassette (No. 3) 1217. A sheet feed roller (No. 3) 1219 feeds the sheets in the cassette (No. 3) 1217 on the basis of an instruction from the engine control unit. A transportation roller (No. 3) 1220 transports the sheets, which are started to be fed by the sheet feed roller (No. 3) 1219, to a transportation path.

Numeral 1221 denotes a sheet tray which is used to set the sheets to a manual sheet feed port No. 4. A sheet feed roller (No. 4) 1222 feeds and transports the sheets from the sheet tray 1221 to the inside of the apparatus.

Numeral 1223 denotes oblique transfer correction rollers which correct an oblique transfer of the sheet. Numeral 1224 denotes a resist roller sensor which takes a synchronization with a transportation of the fed sheet and starting of writing an image to the photosensitive drum 1201. Numeral 1225 denotes a sheet discharge sensor which judges whether or not the sheet is normally discharged from the fixing unit. Numeral 1226 denotes a facedown discharge tray which is used to stack the discharged sheets.

In a sheet transportation system of the present embodiment, a junction of the sheet feed port No. 1 and the sheet feed port No. 2 is indicated by a junction A, and a junction of the sheet feed port No. 2 and the sheet feed port No. 3 is indicated by a junction B.

Figure 6:
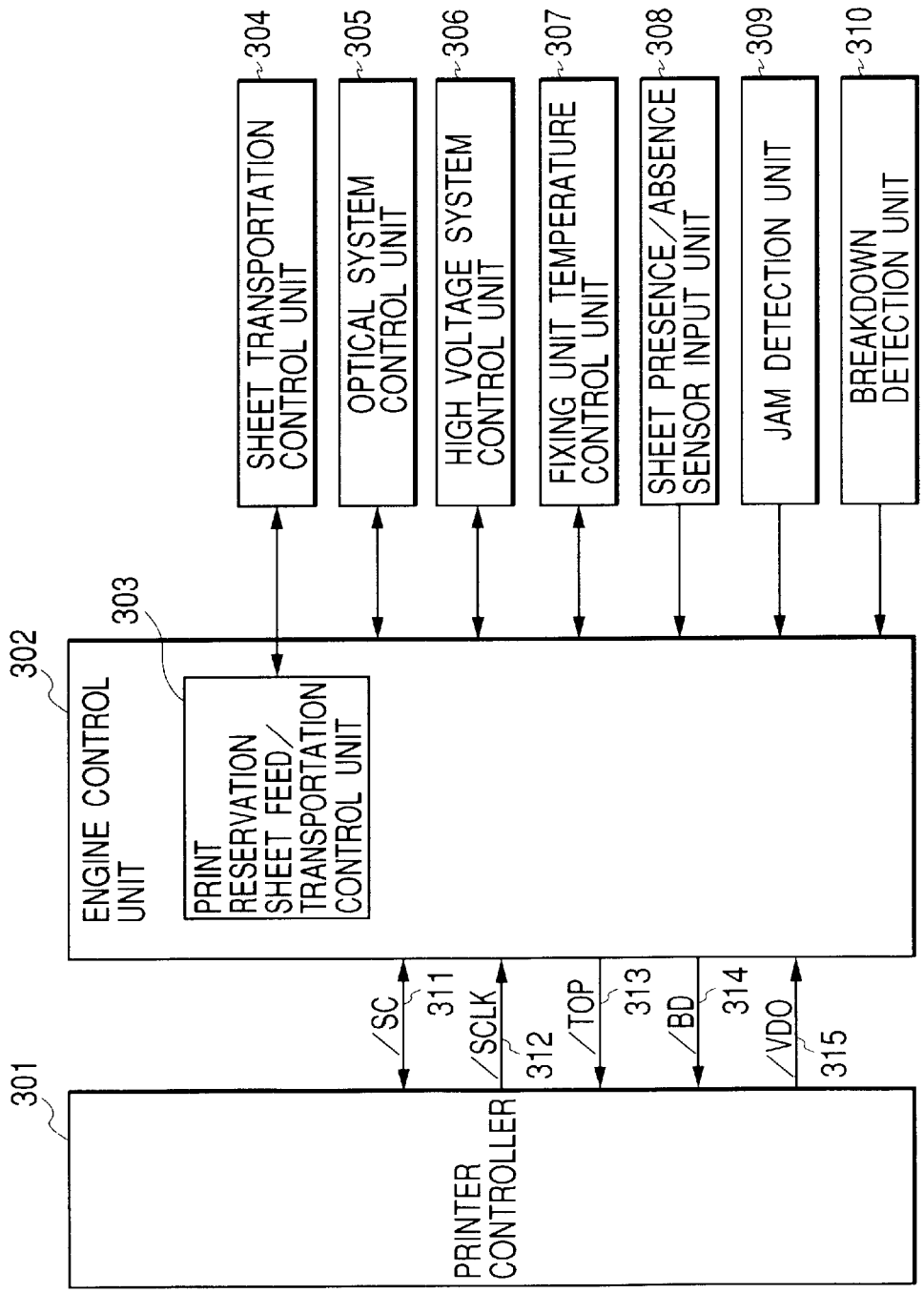
FIG. 6 is a block diagram showing the circuit structure of a control system of the printer according to the second embodiment.

FIG. 6 is a block diagram showing the circuit structure of a printer control system according to the second embodiment. In FIG. 6, numeral 301 denotes an image controller (a printer controller) which develops an image code signal from a host computer into bit map data, instructs a command to the engine control unit 302 through a serial communication line, performs a control of status reading, and outputs printing data to the engine according to an image timing signal. Numeral 302 denotes the engine control unit which controls each section of the engine on the basis of an instruction on the serial communication from the image controller 301.

Numeral 303 denotes a print reservation sheet feed/transportation control unit which is in the engine control unit 302 controls to transport the sheet corresponding to a reserved job to a position where a printing operation can be performed in order of a job designated by a print command even if the print command to be instructed after the reservation differs from the reservation order considering a print reservation command from the image controller and a junction of the transportation system. Numeral 304 denotes a sheet transportation control unit which directly drives a mechanism used in feeding and transporting the sheets on the basis of an instruction from the print reservation sheet feed/transportation control unit 303.

Numeral 305 denotes an optical system control unit which drives each function unit of an optical system such as a scanner motor, a laser unit or the like on the basis of the instruction from the engine control unit. Numeral 306 denotes a high voltage system control unit which controls a high voltage unit operating on each electrophotographic process of charging, developing or transferring. Numeral 307 denotes a fixing unit temperature control unit which controls the temperature of the fixing unit on the basis of the instruction from the engine control unit 302.

Numeral 308 denotes a sheet presence/absence sensor input unit which notifies information of the presence/absence of the sheets in the cassette and the presence/absence of the sheets in the transportation path to the engine control unit 302 and the print reservation sheet feed/transportation control unit 303. Numeral 309 denotes a jam detection unit which detects abnormality on transporting the sheets. Numeral 310 denotes a breakdown detection unit which detects the breakdown of the fixing unit, a scanner unit or the like.

Next, the function of an interface between the image controller 301 and the engine control unit 302 will be explained.

Numeral 311 which denotes a command/status line in a serial communication is an interactive signal line for a signal /SC. Numeral 312 denotes a serial clock /SCLK for the serial communication. Numeral 313 denotes a vertical sync signal /TOP for taking a synchronization with an image output and the sheet transportation. Numeral 314 denotes a horizontal sync signal /BD for taking a synchronization with a rotation of the scanner motor and the image output. Numeral 315 denotes an image signal /VDO to be developed into bit map data by the image controller 301 and output from the image controller 301 synchronized with each signal /BD.

Figure 7:
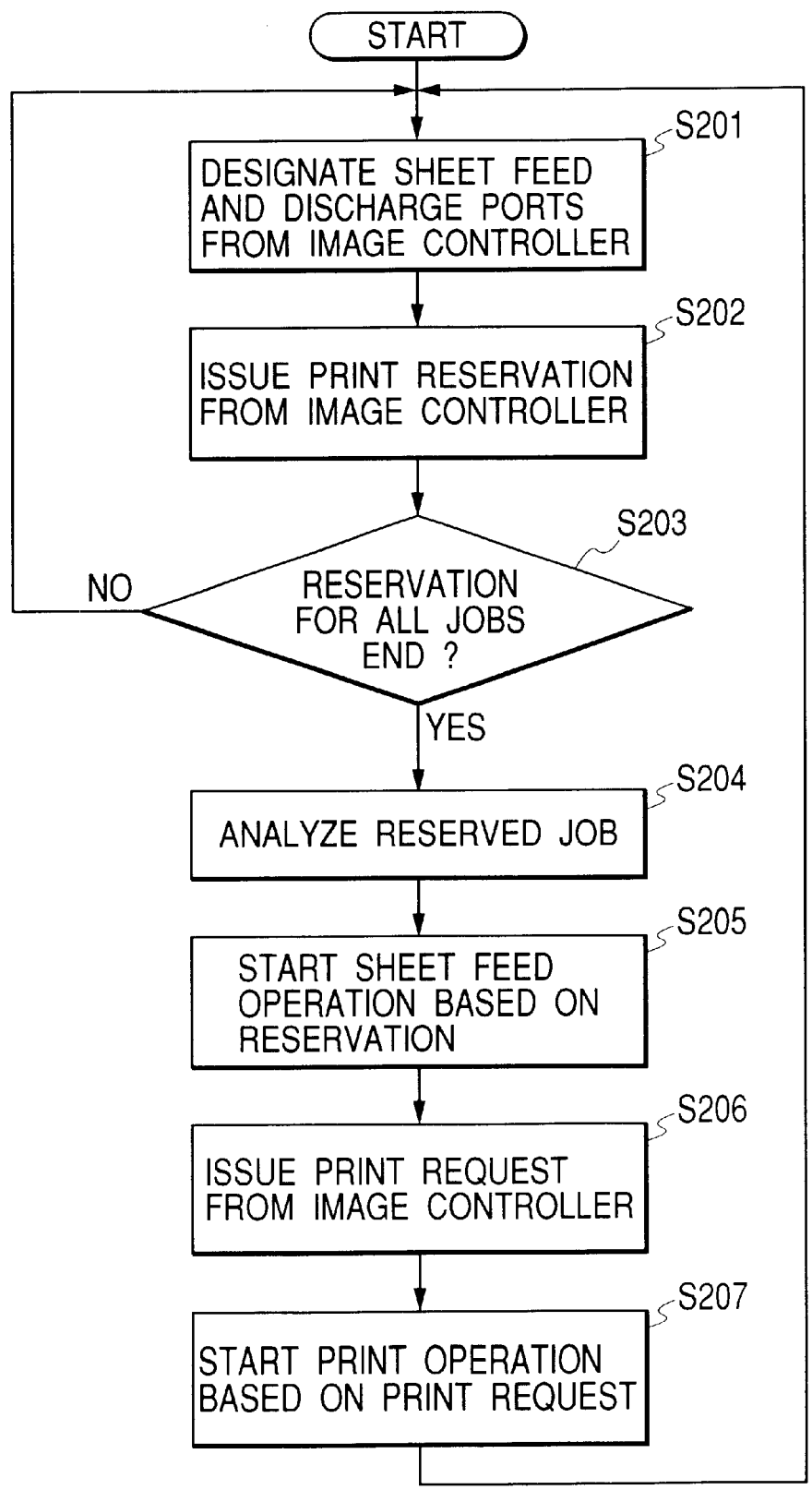
FIG. 7 is a flow chart showing a processing operation from a print reservation to a print execution according to the second embodiment.

FIG. 7 is a flow chart showing processing operation (protocol) from a print reservation to a print execution according to the second embodiment. It should be noted that this operation is performed according to an instruction from a CPU (not shown) on the basis of a program stored in a ROM (not shown). In the present embodiment, when the print reservation for plural pages of using the plural sheet feed ports is made, it is possible to perform printing in an arbitrary order for the print reserved plural pages.

First, a designation related to the sheet feed port and a sheet discharge port is received from the image controller 301 (S201). If the designation is not received, a default sheet feed port held by the engine when the power is turned on is set.

In this state, upon receiving the print reservation command from the image controller 301, the print reservation command is stored into the engine control unit 302 together with an ID number which reserved the sheet feed and the sheet discharge from the sheet feed/discharge ports, the sheet size of the sheet feed port and the like. In case of intending to reserve a different job by changing the sheet feed/discharge ports, the image controller 301 may issue the print reservation command after initially resetting a sheet feed/discharge ports designation command (S202). In this manner, the image controller can reserve plural jobs, which also includes jobs of different sheet feed/discharge ports, before starting the printing operation.

The image controller 301 can reserve sequential jobs after terminating the reservation of all the jobs (S203) or performing the printing operation which reserved a certain job. An explanation of FIG. 7 indicates the former case. The engine control unit 302 judges that the sheets can be transported to what position on the transportation path based on information of the sheet feed/discharge ports and the sheet size of the reserved job after terminating the reservation of the job (S204).

For example, when the job reservation is made by the following order of {job 1 (sheet feed port No. 1, sheet discharge F/D (facedown sheet discharge), sheet size A4)}, {job 2 (sheet feed port No. 3, sheet discharge F/D (facedown sheet discharge), sheet size B5)}, and {job 3 (sheet feed port No. 2, sheet discharge F/D (facedown sheet discharge), sheet size A4)}, the sheet feed of the job 1 is performed to a forward position (upper-stream) of the junction A in FIG. 5, the sheet feed of the job 2 is performed to a forward position of the junction B, and the sheet feed of the job 3 is performed to a forward position (upper-stream) of the junction B (S205).

By transporting the sheets to the above position, even if the job is requested by an order different from the reserved order such as an order of job 3, job 1 and job 2 (S206), each printing operation can be performed without inviting any trouble (S207). Furthermore, since the sheets are previously transported to a transportable position, a throughput in printing can be improved.

FIG. 8 is a diagram showing the constitution of the print reservation command and the print command according to the second embodiment.

The print reservation command has the 16-bit data structure in which the upper 10-bit data indicates the print reservation command, and the lower 4-bit data indicates an ID number of the print job. The ID number corresponds to the print command described later, and when the job of the reserved ID code is to be performed, the image controller 301 can perform the job by instructing the same ID number by the print command.

Furthermore, according to designation of the command from the image controller 301, in case of performing the print reservation and the print execution explained in the above first embodiment in the same order (first-in, first-out), it is possible to structure that a sheet feed mode capable of extracting the maximum throughput in reserving the printing and a mode explained in the second embodiment can be selected by selection means (not shown).

In this manner, by structuring that the both modes can be designated from the image controller 301, it is possible to cope with a request from the image controller flexibly.

(Other Embodiments)

The present invention is applicable to a system composed of plural equipments (e.g., a host computer, an interface equipment, a reader, a printer and the like) or to an apparatus including a single equipment (e.g., a copying machine or the like).

It is needless to say that the object of the present invention can be achieved in a case where a storage medium storing the program codes of a software for realizing the functions of the above-described embodiments is supplied to a system or an apparatus an then a computer (or CPU or MPU) in the system or the apparatus reads and executes the program codes stored in the memory medium.

In this case, the program codes themselves read from the storage medium realize the functions of the embodiments, and the storage medium storing such the program codes constitute the present invention.

The storage medium for supplying the program codes can be, for example, a floppy disk, a hard disk, an optical disk, a magnetooptical disk, a CD-ROM, a CD-R, magnetic tape, a non-volatile memory card, a ROM, or the like.

It is needless to say that the present invention also includes not only the case where the functions of the embodiments are realized by the execution of the program codes read by the computer, but also a case where an OS (operating system) or the like functioning on the computer executes all the process or a part thereof according to the instructions of the program codes, thereby realizing the functions of the embodiments.

Further, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all the process or a part thereof according to the instructions of such program codes, thereby realizing the functions of the embodiments.

The present invention is not limited to the above embodiments, but may be modified in various manners within the scope of the following claims.

What is claimed is:

1. An image formation apparatus of an electrophotographic system, comprising:

sheet feed means for feeding recording sheets one by one;

transportation means for transporting the recording sheets fed by said sheet feed means to a position where a visualized image formed on a photosensitive drum is transferred to the recording sheet, through a transportation path;

an engine control unit for controlling drives of said sheet feed means and said transportation means; and a printer control unit for developing image data and transmitting a print request command to said engine control unit, wherein said engine control unit has judgment means for judging whether or not the recording sheets can be fed when a print reservation command for plural pages of the sheets was received from said printer control unit prior to the print request command, and the drives of said sheet feed means and said transportation means are controlled to transport the recording sheets to a predetermined position on the transportation path when said judgment means judges that the recording sheets can be fed.

2. An apparatus according to claim 1, wherein a serial communication is performed between said engine control unit and said printer control unit.

3. An apparatus according to claim 1, wherein when it is designated that the recording sheets are fed from plural sheet feed ports according to the print reservation command for plural pages, the drives of said sheet feed means and said transportation means are controlled to transport the recording sheets from the plural sheet feed ports to the lowest-stream position capable of performing printing in order of a print reservation for the plural pages prior to the print request command.

4. An apparatus according to claim 1, wherein when it is designated that the recording sheets fed from plural sheet feed ports according to the print reservation command for the plural pages, the drives of said sheet feed means and said transportation means are controlled to transport the recording sheets from the plural sheet feed ports to a stream position more upper than a junction of the most-upper-stream on the transportation path in case of feeding the sheets from the plural sheet feed ports prior to the print request command.

5. An apparatus according to claim 1, wherein when it is designated that the recording sheets are fed from plural sheet feed ports according to the print reservation command for the plural pages, there is set a mode for controlling the drives of said sheet feed means and said transportation means to transport the recording sheets from the plural sheet feed ports to the lowest-stream position capable of performing printing in order of the print reservation for the plural pages prior to the print request command, a mode for controlling the drives of said sheet feed means and said transportation means to transport the recording sheets from the plural feed ports to a stream position more upper than a junction of the most-upper-stream on the transportation path in a case where the sheets were fed from the plural sheet feed ports to the print request command, and selection means for selecting one of the both modes.

6. An image formation apparatus of an electrophotographic system, comprising:

sheet feed means for feeding recording sheets one by one;

transportation means for transporting the recording sheets fed by said sheet feed means to a transference means for transferring a visualized image formed on a photosensitive drum to the recording sheet, through a transportation path;

an engine control unit for controlling drives of said sheet feed means and said transportation means; and a printer control unit for developing image data and transmitting a print command for issuing a print instruction and a print reservation command for previously instructing print information such as a sheet feed port, sheet size or the like prior to the print command, to the engine control unit through a serial communication line, wherein said engine control unit has judgment means for judging whether or not a sheet feed operation of the recording sheets can be performed when the print reservation command for plural pages was received from said printer control unit, and when said judgment means judged that the recording sheets can be fed, drives of said sheet feed means and said transportation means are controlled to transport the recording sheets to a predetermined position on the transportation path.

7. An apparatus according to claim 6, wherein plural sheet feed means are equipped, and said transportation means can be driven or stopped in driving of said transference means, wherein the predetermined position on the transportation path is more upstream than that of said transference means, and a leading edge of the recording sheet is on a more downstream position from where the sheet is not transported to said transference means when said transportation means is stopped, wherein the drives of said sheet feed means and said transportation means are controlled to feed and transport the recording sheets to the predetermined position on the transportation path in order of reception of the print reservation command, when said engine control unit receives the print reservation command for plural pages to be fed from said plural sheet feed means from said print control unit.

8. An apparatus according to claim 6, wherein plural sheet feed means are equipped, and each of said sheet feed means can be driven or stopped in driving of said transportation means, wherein the predetermined position on the transportation path is more upper than that of a junction where a transportation path of another sheet feed means is interflowed, and a leading edge of the recording sheet is on the lowest-stream position from where the sheet is not transported to the junction when said sheet feed means is stopped, wherein the drives of said sheet feed means and said transportation means are controlled to feed and transport the recording sheets to the predetermined position on the transportation path from all of said sheet feed means reserved in the print reservation command, when said engine control unit receives the print reservation command for plural pages to be fed from said plural sheet feed means from said print control unit.

9. An apparatus according to claim 6, wherein when said engine control unit received the print reservation command for the plural pages to be fed from said sheet feed means from said print control unit, there equipped selection means which can select one of control means from first control means for controlling the drives of said sheet feed means and said transportation means to feed and transport the recording sheets to the predetermined position on the transportation path in order of reception of the print reservation command and second control means for controlling the drives of said sheet feed means and said transportation means to feed and transport the recording sheets to the predetermined position on the transportation path from all of said sheet feed means reserved in the print reservation command.

10. A control method of an image formation apparatus of an electrophotographic system, comprising:

a sheet feed step of feeding recording sheets one by one from sheet feed means;

a transportation step of transporting the recording sheets fed by said sheet feed means to a transference means for transferring a visualized image formed on a photosensitive drum to the recording sheet, through a transportation path;

an engine control step of controlling drives of said sheet feed step and said transportation step by an engine control unit; and a printer control step of developing image data and transmitting a print command for issuing a print instruction and a print reservation command for previously instructing print information such as a sheet feed port, sheet size or the like prior to the print command, to the engine control unit through a serial communication line by a printer control unit, wherein the engine control unit judges whether or not a sheet feed operation of the recording sheets can be performed when the print reservation command for plural pages is received from the printer control unit, and when it is judged that the recording sheets can be fed, drives of said sheet feed means and said transportation means are controlled to transport the recording sheets to a predetermined position on the transportation path.

11. An image formation apparatus comprising:

image formation means for forming images on recording sheets;

sheet feed means for feeding the recording sheets;

transportation means for transporting the recording sheets fed by said sheet feed means to said image formation means through a transportation path;

an engine control unit for controlling drives of said sheet feed means and said transportation means; and reception means for receiving a print request command transmitted from a printer control unit and a reservation command used in reserving printing prior to the print request command, wherein said engine control unit has judgment means for judging whether or not the recording sheets for pages corresponding to print reservation can be fed, and the plural recording sheets can be fed before receiving the print request command in accordance with a judgment of said judgment means in a case where the print reservation for plural pages is made by using the reservation command.

12. An apparatus according to claim 11, wherein plural sheet feed means are provided, and at least one of said sheet feed means and sheet size can be designated for every recording sheet of each page corresponding to the print reservation from the printer control unit.

13. An apparatus according to claim 12, wherein when the print reservation for plural pages to use said plural sheet feed means is made, printing is performed in order of the made print reservation.

14. An apparatus according to claim 13, wherein the recording sheets are fed every page corresponding to the print reservation at timing of corresponding to information related to the recording sheets of pages previously print reserved.

15. An apparatus according to claim 12, wherein when the print reservation for the plural pages to use said plural sheet feed means is made, printing can be performed in an arbitrary order for the print reserved plural pages.

16. An apparatus according to claim 15, wherein when the print reservation for the plural pages to use said plural sheet feed means is made, said engine control unit controls drives to feed and transport the recording sheets by the sheet feed means to an upstream position at a junction, where a transportation path from said sheet feed means joins a transportation path from another sheet feed means.

17. An apparatus according to claim 12, wherein when the print reservation for the plural pages to use said plural sheet feed means is made, selection means selects one of a first mode for performing printing in order of the made print reservation and a second mode for performing printing in an arbitrary order for the print reserved plural pages.

18. An apparatus according to claim 11, further comprising said printer control unit.

19. An apparatus according to claim 18, wherein said printer control unit has means for developing image code data transmitted from an external equipment to bit data necessary for an image formation.

20. An apparatus according to claim 11, wherein said image formation means has means for forming an image on an image support body using an electrophotographic method and transference means for transferring the image formed on the image support body to the recording sheet.

* * * * *

UNITED STATES PATENT AND TRADEMARK OFFICE
CERTIFICATE OF CORRECTION

PATENT NO.    : 6,496,660 B2  
DATED         : December 17, 2002  
INVENTOR(S)   : Atsuya Takahashi et al.

It is certified that error appears in the above-identified patent and that said Letters Patent is hereby corrected as shown below:

<u>Column 5,</u>  
Line 52, "serves" should read -- serving --.

Signed and Sealed this

First Day of July, 2003

JAMES E. ROGAN
*Director of the United States Patent and Trademark Office*